March 2, 1965  R. L. WOLFE  3,171,515
SPRING APPLIED-MAGNETICALLY RELEASED BRAKE
Filed June 26, 1962  2 Sheets-Sheet 1
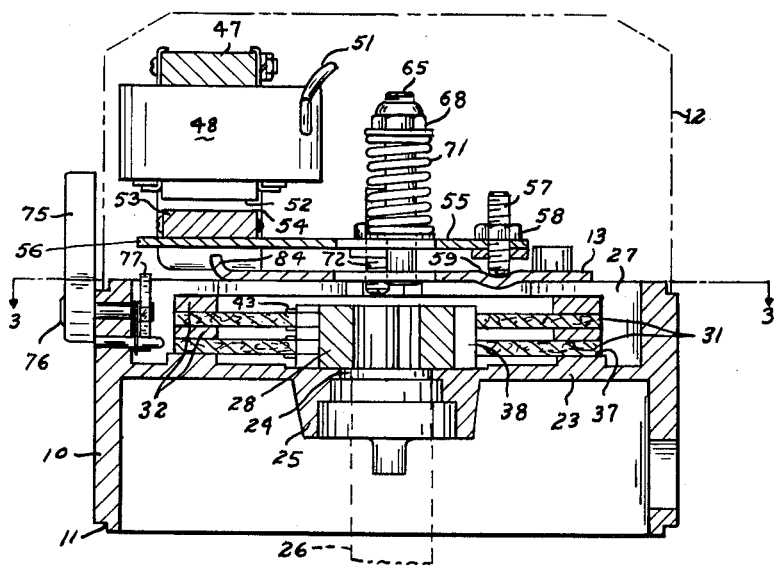
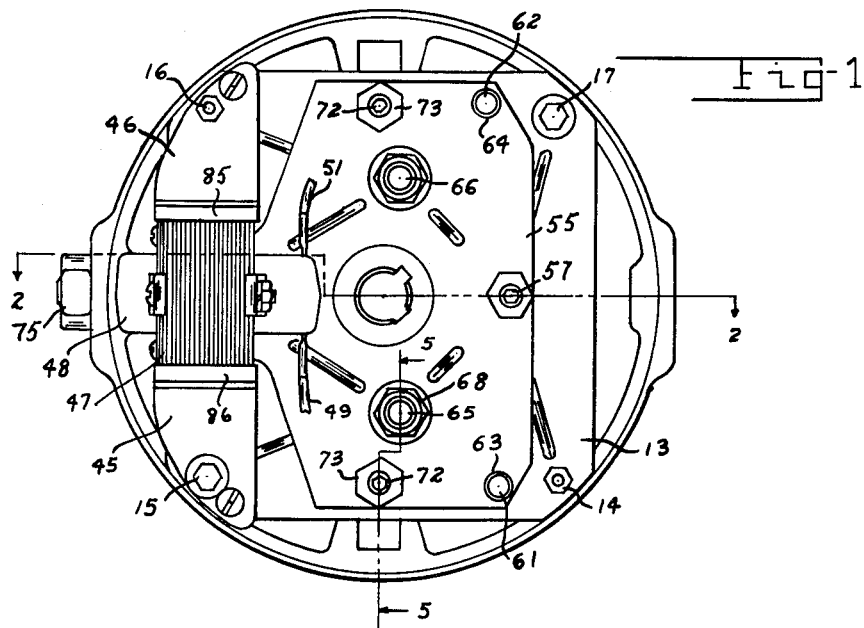
INVENTOR
ROBERT L. WOLFE
BY Tom Walker
ATTORNEY

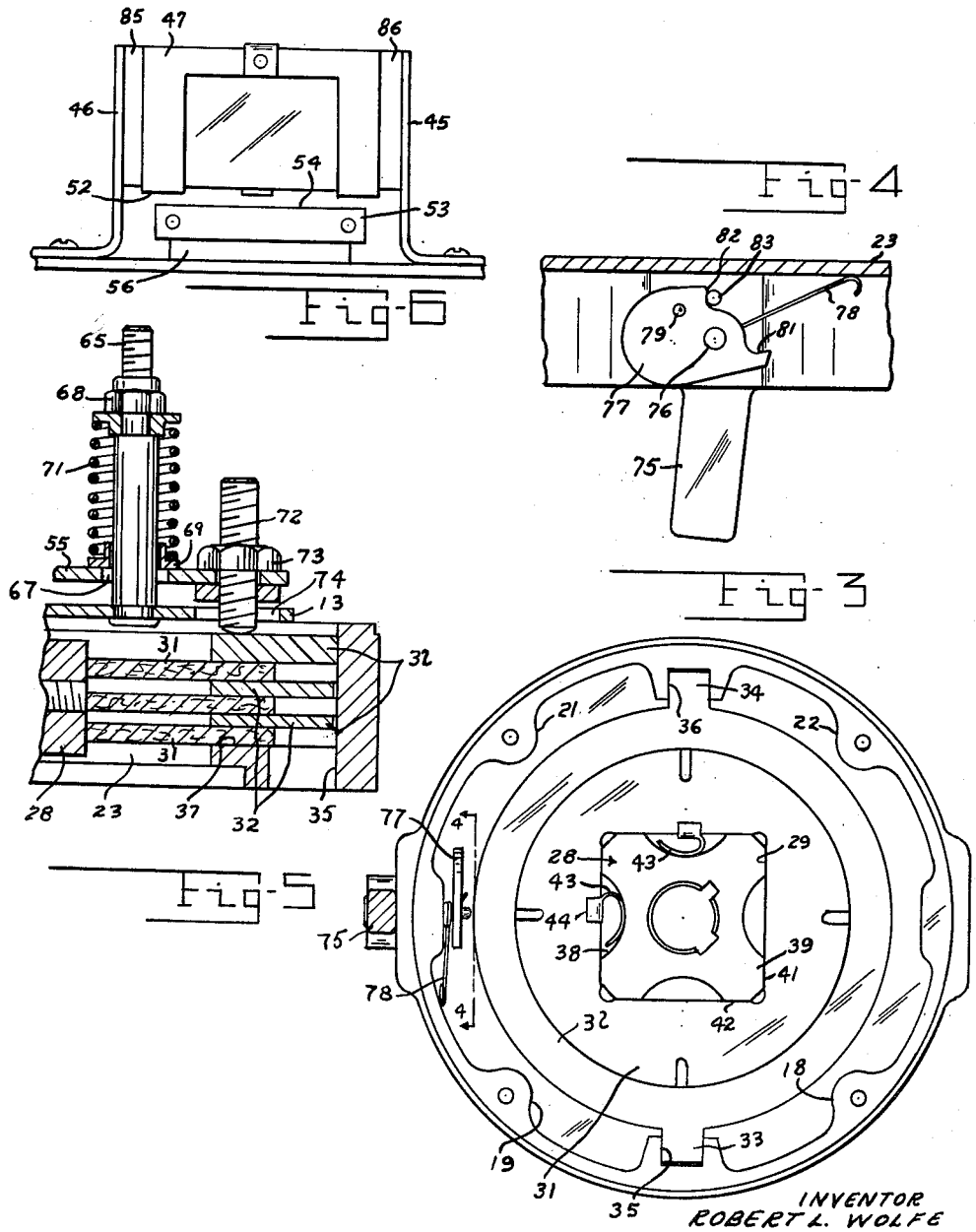

United States Patent Office 3,171,515
Patented Mar. 2, 1965

3,171,515
SPRING APPLIED-MAGNETICALLY RELEASED BRAKE
Robert L. Wolfe, Columbus, Ind., assignor to The Reliance Electric & Engineering Company, Cleveland, Ohio, a corporation of Ohio
Filed June 26, 1962, Ser. No. 205,435
10 Claims. (Cl. 188—171)

This invention relates to brakes for electric motors or other rotating equipment particularly to generally new cooperating assemblies of a brake and brake actuating means.

The object of the invention is to simplify the construction as well as the means and mode of operation of electrically controlled brakes, whereby such brakes may not only be economically manufactured, but will be more efficient and satisfactory in use, adaptable to a wide variety of applications, and be unlikely to get out of order.

A further object of the invention is to provide for increased compactness in brake equipped motors, according to a concept placing the whole of a disc brake assembly within a portion of the motor housing.

Another object of the invention is to provide for simplified actuation of the recessed brake by brake actuating means having an integrated character and mountable on and demountable from the motor or equipment housing as a unit.

A further object of the invention is to provide a unitary brake actuating mechanism adapted to installation on existing equipment.

Still another object of the invention is to provide a new brake actuating mechanism featuring the use of a hinged or pivoted armature plate, self-adjusting in its movements and applying direct compression forces to the disc brake.

A still further object of the invention is to obtain a simplified and improved means for magnetically releasing a spring applied disc brake.

A further object of the invention is to provide an electric motor or like brake possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

FIG. 1 is a plan view of one end of a motor equipped with a brake mechanism in accordance with the illustrated embodiment of the invention, the cover plate of the brake being removed to show the brake actuating unit;

FIG. 2 is a view in cross-section taken substantially along the line 2—2 of FIG. 1, FIG. 2 being inverted with respect to FIG. 1 and the cover plate being shown in phantom form thereon;

FIG. 3 is a view in cross-section taken substantially along the line 3—3 of FIG. 2, this figure, being essentially a view end elevation of the brake housing and contained brake elements with the brake actuating unit removed.

FIG. 4 is a detail view in longitudinal section, taken substantially along the line 4—4 of FIG. 3 showing the manual release for the brake applying means; and FIG. 5 is a fragmentary view in cross-section taken substantially along the irregular line 5—5 of FIG. 1.

Like parts are indicated by similar characters of reference throughout the several views.

Referring to the drawings, brake mechanism in accordance with the invention is generally applicable to equipment having a rotation or rotatable shaft. In its illustrated embodiment the invention is an integral part of an electric motor assembly. According to a feature of the invention the brake mechanism is constructed in a unitary form for simplified installation and removal as well as the more facile adapting of existing motors or other equipment. The brake mechanism may in this connection be detachably mounted on an existing motor flange or similarly installed on equipment having a rotating or rotatable shaft, as noted.

Thus, the brake means proper is contained within a housing section 10 which replaces the conventional end shield and is formed at one end with an inset 11 for engagement with the center or sealed ring portion of the motor housing. The opposite end of housing section 10 is closed by a cover plate 12 which is elongated to provide an enclosure for brake actuating mechanism supported on a mounting plate 13 removably secured to the said other end of housing section 10, as by means of bolts 14–17 passed through corners of the mounting plate and into interior projecting portions 18–22, respectively, of the housing section. Intermediate its ends, the housing section 10 is formed with a transverse partition wall 23. An opening 24 in the wall 23 is coaxial of housing section 10 and is surrounded by a boss 25 extending toward the first mentioned end of the housing section or that end interengaged with the center housing section of the motor. From such center housing section there extends into housing section 10 and to and through longitudinal opening 24 a rotatable shaft 26 which is the rotary shaft of the motor, or extension thereof, continuously rotating when the motor is energized and stopped when the motor is idle.

Extending through and beyond the longitudinal opening 24, the shaft 26 enters what may be considered a recess 27 in the housing section 10. Within such recess the shaft 26 has a keyed connection with a hub member 28. The latter has a generally square configuration to be received within the square outlines of registering openings 29 of superposed discs 31 made of a suitable fibrous friction material. There is in the illustrated instance, as seen in FIG. 2, a pair of the friction discs 31 arranged in alternating relation to a pair of separator rings 32 made of a relatively unyielding material such as metal. Each ring 32 is formed with a diametrically opposed pair of tongues 33 and 34 received in respective grooves 35 and 36 which are of longitudinal extent and formed in internal housing enlargements in recess 27.

Discs and rings 32 make up a friction disc and separator ring assembly which, as indicated, is wholly contained within recess 27. The assembly seats in the bottom of the recess 27 or more particularly upon an annular land 37 on partition wall 23. The land 37 provides a reactant surface for one of the friction discs 31 which may be considered the lowermost or innermost element of the disc ring assembly, the uppermost or outermost of such elements being a ring 32. Accordingly, in the illustrated brake embodiment the two friction discs are clamped or adapted to be clamped between an outer ring 32 and the annular land 37, with another of the relatively unyielding rings 32 interposed between the friction discs. An inward pressure applied to the outer ring element accordingly results in a gripping of the friction discs 31 with a consequent resistance to rotation of the common hub member 28 and shaft 26 to which it is keyed.

The hub 28 has, as noted, a square configuration matching that of the openings 29 in the respective discs 31. The sides of the hub are planar and achieve a relatively close, sliding contact with the sides of opening 29 in each disc. The corners of the hub are cut off or beveled and in each side surface is an arcuate recess 38, the hub being symmetrically formed. The arrangement is one to define tongues 39 at the corners of the hub projecting into respective corners of each opening 29. Further, the configuration of the hub member is such as to define on each tongue angularly disposed faces 41 and 42 engaging planar portions of the sides of opening 29 at the corners thereof. Still further, in a pair of adjoining recesses 38, expansion springs 43 are placed, each held therein by an overturned lip 44. The springs 43 cooperate to bias the discs 31 continuously in a direction so as to cause the faces 41 and 42 of one of the tongues 39 to be firmly contacted by the mating sides of the discs openings 29. An effective driving relationship accordingly is established between the selected tongue and the discs 31, which relationship is maintained as against wear of the engaged portions of the friction discs due to the expansion actions of the springs 43. The springs 43 may be interchangeably arranged in the recesses 38 to establish the described driving relationship between selected tongue portions of the hub member and the disc assembly. Further, the hub itself is removable from the friction disc separator ring assembly and may be reinstalled therein in an inverted or relatively rotatably adjusted position. The springs 43 are strong enough to absorb torque pulsations encountered in operation of the motor. They are, on the other hand, weak enough that the discs float freely on the hub in an axial sense when braking pressure is released. The recesses 38 extend through hub 28 and are common to corresponding springs at all discs 31. Along with the open corners of the disc openings 29 they provide for a flow of air during motor operation through the disc-ring assembly cooling, and a reduction of drag effect in the released condition of the brake, result.

Details of the hub member 28 and of the driving connection established thereby with the friction discs of the brake mechanism are subjects of a separate copending application filed June 26, 1962, Serial No. 205,423, by Charles E. Strain and Orland L. Schram.

The brake actuating mechanism is unitarily disposed, as described, outside the recess 27, the mounting plate 13 thereof being detachably held to the adjacent end of housing section 10 in a superposed generally closed relation to recess 27 and to the contained friction-disc separator-ring assembly. The mounting plate 13 has generally flat and rectangular configuration. At one end thereof upstanding, laterally spaced apart brackets 45 and 46 are fastened. Suspended between such brackets, in vertically spaced overlying relation to the mounting plate 13 is an E-shaped pole unit 47 comprised in a conventional manner of a plurality of plate laminations riveted together in unitary fashion. Coil means 48 extends transversely through the pole unit 47 and includes electrically energizable coils wound around the middle leg of the pole unit and connected as by conductors 49 and 51 in an electrical circuit.

The lower ends of the three legs of the pole unit 47 define a magnet face 52. Spaced from face 52 (as seen in FIGS. 2 and 6) and adapted to cooperate therewith is a bar-like armature 53, comprised of a plurality of plate laminations and having an upturned magnet face 54. The assembly of parts supported by and including the brackets 45 and 46 accordingly is an electro-magnetic device which when energized attracts bar 53 as an armature in a manner to move the bar into contacting relation to face 52 of the pole unit.

An armature plate 55 is in superposed adjacent relation to the mounting plate 13 and has a portion 56 of reduced size extending between the brackets 45 and 46 to which armature 53 is secured. At a point spaced longitudinally from the portion 56, and aligned therewith, the armature plate 55 has a screw stud 57 set therein and locked against axial adjustment by a nut 58. The stud 57 extends through and beyond the armature plate 55 and at what may be considered its inner projecting end is rounded in contour and seats in a shallow curved recess 59 in the mounting plate 13. Stud 57 and projecting portion 56 of armature plate 55 are at opposite ends of the armature plate, the arrangement being one to give the armature plate a hinged or pivotal mounting whereby it may rock upon stud 57 in response 60 energizing of the coil means 48 to allow armature 53 to rise and engage magnet faces 52 and 54. Pivot stud 57 is, moreover, located intermediate the side edges of the armature plate 55 in such manner as to allow the armature plate rocking motion in both longitudinal and lateral planes. Hence the armature plate may readily tilt to adjust itself as may be necessary for full mating engagement of the faces 52 and 54.

The armature plate is held against bodily displacement in a rotary sense by laterally spaced apart upstanding studs 61 and 62 which are set in the mounting plate 13 and extend upward through slightly oversize respective openings 63 and 64 in the armature plate. Further, the mounting plate 13 has stationarily installed therein a pair of laterally spaced apart upstanding posts 65 and 66. These project upward from the mounting plate to respective oversize openings 67 (FIG. 5) in the armature plate. Above the armature plate each such post has a nut 68 rotatably adjustable thereon. Between the nut 68 and a sleeve 69 resting on plate 55 is a compression spring 71. The arrangement accordingly is one to urge the armature plate 55 downward (as seen in FIG. 2) or in a direction to separate armature 53 from the pole unit 47 of the electro-magnetic means.

Also carried by the armature plate 55, near each side edge thereof, is a further screw stud 72 locked to the armature plate in an axially adjusted position by nuts 73. As shown in FIG. 5, each stud 72 projects through the armature plate 55 and through and beyond mounting plate 13 by way of an opening 74 therein, the inner end of such stud projecting into recess 27 of housing section 10 and bearing upon the uppermost separator ring 32 of the friction disc and separator ring assembly. At diametrically opposed points, therefore, the armature plate 55 is adapted to apply pressure to the friction disc and separator ring assembly in a manner to apply a braking force as heretofore seen.

The brake mechanism is, in the illustrated instance, of the spring-setting magnetically-released type. Thus, when armature plate 55 is under influence of the compression spring spring 71 the plate is deflected inward in a manner to apply a compressive force through the screw studs 72 to the housing contained friction-disc separator-ring assembly. The brake accordingly is at this time applied or on and the shaft 26 is held from rotation. The brake is released by energizing of the coil means 48, this action serving to raise armature plate 55 against the urging of springs 71 and thereby removing the compressive force applied to the disc brake assembly. Conventionally, the circuit for energizing coil means 48 is a part of the motor starting or running circuit whereby the braking action may be relieved or released while the motor is running and restored to effectiveness simultaneously with shutting off of the motor. Braking action may also be relieved by energizing coil means 48 independently of the running or starting windings of the motor. Further, spring setting magnetically released brake apparatus may provide a means for manually releasing the brake in order that shaft 26 may be turned for purposes of test, inspection and the like at times when the motor is not running. In the present instance such a form of release is provided for in an externally mounted lever 75 secured to a stub shaft 76 transversely disposed in the wall of housing section 10 in a position of general alignment with the projecting portion 56 of armature plate 55. On the inner end of stub shaft 76 is fastened a cam 77 adapted upon turning of the lever 75 to engage the projecting extremity of portion 56, and, upon continued motion of the lever 75 in the same direction to lift the armature plate 55 in a releasing direction in the same manner as it is released or raised upon energizing of coil means 48. A torsion spring 78 reacts against partition wall 23, is suitably wound on shaft 76 and engages the cam 77 at location 79 in a manner to urge the cam 77 in a lowered or nonactuating position. Accordingly, the cam 77 is normally inactive, and, additionally, when coil means 48 is energized with the brake in a manually released condition, cam 77 will be restored to its normal position as portion 56 of the armature plate moves away from frictional contact therewith. The cam 77 is movable in an arcuate sense between two extremes of operation in which respective spaced shoulders 81 and 82 limit selectively against a stud 83 set in the housing wall near shaft 76.

The mounting plate 13 has an upturned lip 84 limiting downward motion of the armature plate 55. A maximum permitted air gap between the magnet faces 52 and 54 thus is provided for irrespective of wear conditions which may occur in the brake disc assembly. Screw studs 72 are adjustable, as described and so may be made to compensate for such wear to maintain the applied braking pressure when stopping of the armature plate indicates, through insufficient braking effect, the need for greater take-up in the friction disc-ring assembly. The relationship of the armature plate 55 and mounting plate 13, along with the controlled air gap and braking pressure are subjects of a separate co-pending application filed June 26, 1962, Serial No. 205,424 by Charles E. Strain.

In the electromagnetic means, the pole unit 47 is separated from the brackets 45 and 46 by members 85 and 86 made of a relatively soft resilient material such as rubber or its equivalents. The arrangement is one to yield advantageous structural results including reductions in noise and vibration, the inhibiting of breakage and self-adjustment of pole and armature parts. The structure of the electromagnetic means in this respect is the subject of a separate, co-pending application filed June 26, 1962, Serial No. 205,425 by J. N. Vogelsong and Charles E. Strain.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A brake actuating mechanism for unitary installation and removal including a mounting plate, an armature plate in superposed adjacent relation to said mounting plate, a pivot means fixed to project from said armature plate in nested end bearing relation to said mounting plate, to provide thereby for relative tilting motion of said armature plate in both a lateral and longitudinal sense, in reference to said mounting plate, while inhibiting bodily shifting motion therebetween electro-magnetic means on said mounting plate cooperable with a portion of said armature plate to effect a lifting motion of said portion, spring means in operative connection with said mounting plate and urging said armature plate in a direction opposed to the said lifting motion, and means in connection with said armature plate for applying braking pressure in a direction opposed to that of said lifting motion.

2. A brake actuating mechanism according to claim 1, characterized by said means for applying braking pressure being projectable through said mounting plate.

3. A brake actuating mechanism for unitary installation and removal including a mounting plate, an armature plate in superposed adjacent relation to said mounting plate and having brake pressure applying means thereon, a single pivot in connection with said armature plate and in end bearing relation to a portion of said mounting plate intermediate side edges of said armature plate, said pivot providing for relative tilting motions of said armature plate in a plurality of planes and inhibiting relative bodily shifting motions thereof, electro-magnetic means on said mounting plate, said armature plate having a portion longitudinally spaced from the location of said pivot extending into cooperative relation with said electro-magnetic means and adapted to be lifted thereby to rock said armature plate in one direction, said armature plate being self-adjustable by virtue of its capability of movement in different planes for proper mating engagement with the electro-magnetic means, and yielding means urging said armature plate in a direction opposed to the direction it moves under influence of said electromagnetic means.

4. A brake actuating mechanism for unitary installation and removal including a mounting plate, an armature plate in superposed adjacent relation to said mounting plate and having brake pressure applying means thereon, a single pivotal connection between said armature plate and said mounting plate intermediate side edges of said armature plate and providing for relative tilting motions of said armature plate in a plurality of planes and inhibiting relative bodily shifting motions thereof, electromagnetic means on said mounting plate, said armature plate having a portion longitudinally spaced from the location of said pivotal connection extending into cooperative relation with said electro-magnetic means and adapted to be lifted thereby to rock said armature plate in one direction, said armature plate being self-adjustable by virtue of its capability of movement in different planes for proper mating engagement with the electro-magnetic means, and yielding means urging said armature plate in a direction opposed to the direction it moves under influence of said electro-magnetic means, said pivotal connection between said armature plate and said mounting plate including a stud set in one of said plates and engaging a recess in the other, said stud being axially adjustable to define different initial positions of adjustment of said armature plate assumed thereby under the stress of said yielding means.

5. A brake actuating mechanism for unitary installation and removal, including a mounting plate, electro-magnetic means on said mounting plate including a pair of spaced brackets secured to said plate, and supporting between them a pole unit and energizable coil in suspended overlying relation to said mounting plate, an armature plate supported on said mounting plate for relative rocking motion in a plurality of planes, said armature plate having a portion projecting between said brackets in underlying relation to said pole unit and coil to be lifted upon energizing of said coil whereby to rock said armature plate in one direction, spring means reacting on said mounting plate and urging said armature plate in an opposed sense, stud means on said armature plate extending through and beyond said mounting plate and constituting a brake pressure applying means, and a ball pivot connection between said mounting plate and said armature plate providing for rocking motion of said armature plate as described, said ball pivot connection and the said projecting portion of said armature plate being in aligned longitudinally spaced relation to one another.

6. In a device of the kind described, a housing, a friction disc and separator ring assembly received in said housing, and a brake applying mechanism unitarily installed on said housing in generally superposed overlying relation to said assembly, said mechanism including a mounting plate fastened to bridge said housing, an armature plate in superposed adjacent relation to said mounting plate on the outer surface thereof, said armature plate having an off-center pivot bearingly nested in said mounting plate in a manner to inhibit bodily shifting motion while allowing for relative rocking motion, in different planes, electro-magnetic means mounted on said mounting plate and presenting a pole unit and electrically energizable coil in overlying spaced relation to said mounting plate, a portion of said armature plate extending beneath said pole unit to be attracted thereto for rocking of said armature plate in response to energizing of said coil, spring means stressing said armature plate in an opposed sense, and means on said armature plate extending through and beyond said mounting plate to engage and apply a compressive force to said friction disc and separator ring assembly.

7. A brake actuating mechanism for unitary installation and removal, including mounting and armature plates in generally parallel near-by relation, said armature plate having side and front and rear edges, a pivotal connection between said armature plate and said mounting plate inhibiting relative bodily shifting motion therebetween while allowing relative tilting motion of said armature plate in both lateral and longitudinal senses, said connection to said armature plate being made intermediate its side edges near its rear edge, electro-magnetic means including a pair of laterally spaced apart brackets fixed to said mounting plate in advance of the front edge of said armature plate and supporting between them a pole unit and an energizable coil in spaced relation to said mounting plate, said armature plate having a portion projecting from the front edge thereof between said brackets, an armature on said projecting portion of said armature plate attracted to said pole unit by energizing of said coil, said armature plate rocking in one direction about said pivotal connection to allow said armature to engage said pole unit, stud means secured at one end to said mounting plate and extending through said armature plate to project at its other end relatively thereto, said stud means passing through said armature plate between front and rear edges of said armature plate, compression spring means installed on said stud means and bearing on said armature plate urging said armature plate toward rocking motion in an opposite direction about said pivoted connection, and other stud means fixed to said armature plate and extending through and beyond said mounting plate and constituting a brake pressure applying means.

8. A brake actuating mechanism according to claim 7, characterized in that the first said stud means comprises a plurality of laterally spaced apart studs each having limit means at its said other end, an individual compression spring being interposed between each such limit means and said armature plate.

9. A brake actuating mechanism according to claim 7, characterized in that said pivotal connection between said mounting plate and said armature plate comprises a detent recess in said mounting plate and a stud installed in said armature plate and having one end seated in said recess.

10. A brake actuating mechanism according to claim 7, characterized in that said projecting portion of said front edge of said armature plate extends as a tongue between said brackets, said armature being transversely disposed thereon to be approximately coextensive with a normally spaced apart opposing face of said pole unit.

References Cited in the file of this patent

UNITED STATES PATENTS

| | | |
|---|---|---|
| 1,154,791 | Marr | Sept. 28, 1915 |
| 1,610,208 | McDonald | Dec. 7, 1926 |
| 2,026,513 | Trombetta | Dec. 31, 1935 |
| 2,119,846 | Fuller | June 7, 1938 |
| 2,164,521 | Hodgson | July 4, 1939 |
| 2,215,909 | McWhirter et al. | Sept. 24, 1940 |
| 2,273,328 | Miller | Feb. 17, 1942 |
| 2,775,320 | Vallen | Dec. 25, 1956 |